(12) United States Patent
Eisele et al.

(10) Patent No.: US 7,632,330 B2
(45) Date of Patent: Dec. 15, 2009

(54) PRODUCTION OF IRON USING ENVIRONMENTALLY-BENIGN RENEWABLE OR RECYCLED REDUCING AGENTS

(75) Inventors: Timothy C. Eisele, Atlantic Mine, MI (US); Surendra Komar Kawatra, Houghton, MI (US)

(73) Assignee: Michigan Technological University, Houghton, MI (US)

( * ) Notice: Subject to any disclaimer, the term of this patent is extended or adjusted under 35 U.S.C. 154(b) by 0 days.

(21) Appl. No.: 11/716,352

(22) Filed: Mar. 9, 2007

(65) Prior Publication Data

US 2007/0209480 A1    Sep. 13, 2007

Related U.S. Application Data

(60) Provisional application No. 60/781,796, filed on Mar. 13, 2006.

(51) Int. Cl.
*C21B 13/00* (2006.01)

(52) U.S. Cl. .................. 75/10.46; 75/10.63; 75/471; 75/490

(58) Field of Classification Search .............. 75/321, 75/319, 746, 722
See application file for complete search history.

(56) References Cited

U.S. PATENT DOCUMENTS

| | | | |
|---|---|---|---|
| 4,062,673 A | | 12/1977 | Roberts |
| 4,160,663 A | * | 7/1979 | Hsieh ............... 75/495 |
| 4,239,530 A | * | 12/1980 | Goksel ............. 75/478 |
| 4,360,378 A | * | 11/1982 | Lindstrom ........... 75/448 |
| 4,571,259 A | | 2/1986 | Fey et al. |
| 4,751,259 A | | 6/1988 | Roe et al. |

(Continued)

FOREIGN PATENT DOCUMENTS

EP    1264901    11/2002

(Continued)

OTHER PUBLICATIONS

Machine translation of JP 2001-003063.*

(Continued)

*Primary Examiner*—George Wyszomierski
(74) *Attorney, Agent, or Firm*—James V. Harmon

(57) ABSTRACT

To produce metallic iron from iron ore, a composition comprising a mass of material formed from a mixture of iron ore particles and particles of a reductant that is either a biomass material in particulate form or a plastic resinous material in particulate form is used. The reductant can also be a mixture of biomass material and resin in any proportions. The mass of material comprises at least one body having a shape adapted for smelting such as pellets, briquettes, pieces or lumps. The pellets have sufficient cohesion to maintain the shape into which they have been formed. The invention also provides a new method for smelting iron from its ore which comprises subdividing the ore into particles of a selected size, mixing the subdivided ore particles with particles of a biomass material or particles of a plastic resinous material or with mixtures thereof, forming a mass of the mixture into at least one body with a shape that is suited for smelting in a furnace and placing the body in a furnace and exposing it to sufficient heat to bring the iron therein to smelting temperature within the furnace to thereby produce metallic iron directly from the ore.

15 Claims, 1 Drawing Sheet

U.S. PATENT DOCUMENTS

| | | | |
|---|---|---|---|
| 4,767,449 A | 8/1988 | Rosen | |
| 4,802,914 A | 2/1989 | Rosen | |
| 4,802,919 A | 2/1989 | Fey | |
| 5,060,913 A | 10/1991 | Reid | |
| 5,244,490 A | 9/1993 | Agarwal | |
| 5,307,938 A | 5/1994 | Lillmars | |
| 5,582,631 A | 12/1996 | Myerson et al. | |
| 5,780,195 A * | 7/1998 | Nava | 430/109.2 |
| 5,849,063 A | 12/1998 | Myerson et al. | |
| 6,214,084 B1 | 4/2001 | Saxena et al. | |
| 6,254,665 B1 * | 7/2001 | Matsushita et al. | 75/484 |
| 6,270,552 B1 | 8/2001 | Takedo et al. | |
| 6,277,168 B1 | 8/2001 | Huang et al. | |
| 6,284,017 B1 * | 9/2001 | Kamei et al. | 75/484 |
| 6,592,647 B2 | 7/2003 | Hino et al. | |
| 6,648,942 B2 | 11/2003 | Hoffman | |
| 6,689,182 B2 | 2/2004 | Tokuda et al. | |
| 7,198,658 B2 * | 4/2007 | Sugitatsu et al. | 75/503 |
| 2001/0037703 A1 * | 11/2001 | Fuji et al. | 75/483 |
| 2004/0154436 A1 * | 8/2004 | Ito et al. | 75/476 |
| 2004/0173054 A1 | 9/2004 | Tsuge et al. | |
| 2004/0211295 A1 * | 10/2004 | Kikuchi et al. | 75/484 |
| 2005/0092130 A1 * | 5/2005 | Golberger et al. | 75/10.39 |
| 2007/0258843 A1 * | 11/2007 | Ito et al. | 420/13 |

FOREIGN PATENT DOCUMENTS

| | | | |
|---|---|---|---|
| EP | 1408124 | | 4/2004 |
| JP | 61201740 A | * | 9/1986 |
| JP | 2001003063 A | * | 1/2001 |

OTHER PUBLICATIONS

Nagami, T., 2001, ITMK 3 Premium Ironmaking Process for the New Millenium, Direct from Midres 1st Quarter 2001.

Kobayashi, A New Process To Produce Iron Directly—, (publication) 2001 The Engineering Company, Kobe Steel Ltd, Osaka, Japan.

Nagami, ITmK 3-Premium Iron Making Process—, Kobe Steel Ltd direct from Midrex 1st quarter, 3 pgs., Osaka, Japan, 2001.

Tsuge, Successful Iron Nuggets Production at ITmK 3 pilot plant, (publication) Iron making conference proceedings 2002, Kobe Steel Ltd, Osaka, Japan 2002.

Anameric and Kawatra, Laboratory Study Related to the production and properties of pig iron studies, (Journal) Minerals and Metalergical Processing, Feb. 2006, vol. 23 No. 1 US.

Anameric and Kawatra, Caburization effects on pig iron nugget making, (Journal) Minerals and Metalergical Processing Vol. No. 3, Aug. 2006, US.

Anameric and Kawatra, Pig iron nuggets versus blast furnace pig iron proceedings of the Sohn International Symposium, San Diego, CA vol. 5, 2006 (b) pp. 136-156 and Houghton, MI, Aug. 29, 2006, US.

Anameric and Kawatra, Conditions for making direct reduced iron trasition direct reduced and pig iron nuggets—, (Journal) Minerals and Metalergical Processing vol. 24 No. 1 Feb. 2007, US.

Anameric and Kawatra, The Microstructure of the Pig Iron Nuggets, (Journal) ISIF, International, vol. 47, 2007, No. 1 pp. 53-61, US (Dept. of Chemical Eng.) Houghton, MI.

Anameric and Kawatra, Laboratory Scale Investigation on the Formation of Pig Iron Nuggets, (Journal article) submitted for publication by MI Tech Univ, 2007 at ISIJ Int. 13pgs.

Anameric and Kawatra, Transformation Mechanisms of Self Reducing-fluxing Dried Greenballs Into Pig Iron Nuggets, (publication) MI Tech Univ. Dept. of Chemical Eng., Houghton, MI 2007, 27 pgs.

* cited by examiner

PRODUCTION OF IRON USING ENVIRONMENTALLY-BENIGN RENEWABLE OR RECYCLED REDUCING AGENTS

This application claims the benefit of provisional application Ser. No. 60/781,796 bearing the same title and filed Mar. 13, 2006 which is incorporated herein by reference.

FIELD OF THE INVENTION

This invention relates to the smelting of ore and more particularly a composition and method for the production of metallic iron from iron ore.

BACKGROUND OF THE INVENTION

Since ancient times iron production from iron ore made use of fuels such as coal or charcoal containing free carbon to produce the heat and reducing gases necessary for reduction of the ore. Wood alone produces much less heat, about 6,000-8,000 BTU/lb. compared with coal (12,000-15,000 BTU/lb) and coke (about 12,000-15,000 BTU/lb). In early times with small furnaces and simple air blowing equipment, the temperatures were not high enough to form iron carbide so the iron that formed initially was of little value and the ironmasters had to wait until the fire burned out to retrieve the "bloom," a mass of 25-50 lbs. of iron containing little carbon that could be forged into weapons. Charcoal was used until about 1860 and after that coke produced from coal became the standard fuel for iron smelting. Coal consists largely of free carbon. Hard coal contains about 6% volatile matter and soft coal contains somewhat larger amounts of volatile matter. Coke has more free carbon and is made from coal by burning coal with restricted oxygen and maintaining the temperature of about 1,000° C.-1,300° C. to crack large molecules and drive off volatiles leaving the coke which has a higher mechanical strength and contains about 85-90% free carbon to provide the high temperatures required in iron smelting. In a modem furnace, alternate layers of iron ore, limestone and coke are placed in the furnace. Coke provides the heat required as well as the reducing gases necessary to convert the ore to metallic iron so that in a typical furnace 2,000 tons of iron ore ($Fe_3O_4$), 500 tons of coke and 400 tons of limestone will produce 1,000 tons of pig iron per day as well as 500 tons of slag and a large volume of combustible gas.

In the last few years methods have been developed for what is known as direct iron production; also referred to as the production of iron nuggets from iron ore as described for example in the following journal articles:

Kobayashi I., Tanigahi Y. and Uragami A, A New Process to produce Iron Directly From Fine Ore and Coal, *Iron and Steelmaker*, Vol. 28, No. 9, 2001, pp. 19-22.

Negami T., 2001, ITMK3 Premium Ironmaking Process for the New Millenium, *Direct from Midrex* 1st Quarter 2001.

Tsuge O., Kikukuchi S., and Tokuda K., Successful Iron Nugget Production at ITmk3 Pilot Plant, 61st *Ironmaking Proceedings, Nashville, Tenn.*, 2002.

Anameric B. and Kawatra S. K., Laboratory Study Related to the Production and Properties of Pig Iron Nuggets, *Minerals and Metallurgical Processing*, Vol. 23, No 1, Feb. 2006 (a), pp. 52-56.

Anameric B., Rundman K. B. and Kawatra S. K., Carburization Effects on Pig Iron Nugget Making, *Minerals and Metallurgical Processing*, Vol. 23, No 3, March 2006, pp. 139-151.

Anameric B. and Kawatra S. K., Pig Iron Nuggets Versus Blast Furnace Pig Iron, Presented at TMS Fall Extraction and Processing Meeting, *Proceedings of the Sohn International Symposium*, San Diego, Calif., Vol. 5, 2006 (b), pp. 136-156.

Anameric B. and Kawatra S. K., Conditions for Making Direct Reduced Iron, Transition Direct Reduced Iron and Pig Iron Nuggets in a Laboratory Furnace—Temperature Time Transformations, *Submitted for publication in Minerals and Metallurgical Processing*, May 2006 (c), Preprint no MMP-06-027.

Anameric B. and Kawatra S. K., Microstructural Investigation of the Pig Iron Nuggets Produced at Laboratory Conditions, ISIJ International, No 1, January 2007 (a).

Anameric B. and Kawatra S. K., Laboratory Scale Investigations on the Formation of Pig Iron Nuggets, *Submitted for publications in ISIJ International*, January 2007 (b).

Anameric B. and Kawatra S. K., Transformation Mechanisms of Self Reducing Fluxing Dried Greenballs into Pig Iron Nuggets, Presented at 2007 SME Annual Meeting, 2007 (c).

In these direct iron processes, coal is used as the reductant for the metal oxide. Up to the time of the present invention, commercial direct iron nugget smelting technologies depended upon coal as the reducing agent. To produce the necessary heat, traditional iron making technologies require either coke for blast furnaces or natural gas for direct reduced iron. As a fossil fuel, coal and natural gas is not sustainable in the long term and also leads to increasing levels of carbon dioxide in the atmosphere. Thus, prior to the present invention, it has been widely assumed that only fuels with at least as much energy content as coal were capable of producing the heat and the reducing gases necessary for reducing iron oxides to metallic iron nuggets. Consequently, heretofore only substances such as coal or coke containing large amounts of free carbon have been relied upon in the smelting process. However, besides being a limited nonrenewable resource, the burning of coal has caused environmental problems through the distribution of heavy metals such as mercury into the environment and the production of greenhouse gases which are widely acknowledged to be undesirable.

In view of these and other deficiencies in the prior art, it is one object of the invention to provide a new composition and method for the production of metallic iron from its ore that does not require charcoal, coal or coke yet allows the metal to be produced directly from the ore so that a metallic iron product can be produced for example in close proximity to the mine site allowing the metal to be marketed directly to numerous scrap remelters and other steel makers without passing through the traditional blast furnace process of iron production.

Another object is to produce metallic iron from its ore using renewable or recyclable materials without any kind of pretreatment of renewable materials such as the production of charcoal.

Still another object is to provide a direct iron process for producing metallic iron from its ore that constitutes an environmentally sustainable industry.

A more specific object is to provide a new composition and method for direct iron production wherein the reductant itself can act as the binder for holding a mass of material together without the requirement of an additive for this purpose.

Still another object of the invention is to provide a new composition and method for the production of metallic iron from its ore that results in less contamination of the finished product and smaller quantities of slag.

Yet another object is to provide a process of the type described in which the slag is readily separated from the metallic iron that is produced.

A further object is to provide an improved method and composition for the production of metallic iron which is stable against corrosion, can conveniently be shipped, is suitable feed stock for steel making either by remelting in electric furnaces or as replacement for scrap iron in the basic oxygen furnaces and that is able to employ a wide variety of readily available raw materials as well as other advantages and benefits that will be apparent from the following description.

These and other more detailed and specific objects of the invention will be apparent from consideration of the accompanying specification claims and drawings which illustrate by way of example but a few of the various ways in which the invention can be accomplished within the scope of the appended claims.

SUMMARY OF THE INVENTION

One aspect of the invention concerns the production of metallic iron from its ore which employs a composition comprising a mass of material formed from a mixture of iron ore particles and particles of a reductant that is either a biomass material in particulate form or a plastic resinous material in particulate form. The reductant can also be a mixture of these two substances in any proportions. While the materials can be pieces of any suitable size, it is preferred that the iron as well as the reductant be in particulate form. It is also preferred that the mass of material be a coherent mass formed into bodies of a selected shape adapted for smelting such as pellets, pieces or lumps, and that the composition have sufficient cohesion to maintain the shape into which the mass has been formed. By the term "coherent mass" is meant a mass of material with at least enough cohesion to retain its shape i.e., to remain an integral body.

Another aspect of the invention is a provision of a new method for smelting iron from its ore which comprises subdividing the ore into particles of a selected size, mixing the subdivided ore particles with particles of a biomass material or particles of a plastic resinous material or with mixtures thereof, forming a mass of the mixture into a predetermined shape that is suited for smelting in a furnace, placing the shaped mass in the furnace and exposing it to sufficient heat to raise the temperature of the composition to bring the iron therein to smelting temperature for thereby producing metallic iron directly from the ore. Heat can be produced in any convenient manner as by means of electric heating, by radiation or by the combustion of a gaseous, liquid or solid fuel within the furnace. In spite of the fact that there is virtually no free carbon in the reductant that is placed in the mixture, the present process is highly effective in smelting the ore so as to produce bodies of metallic iron without any requirement for coal, coke, charcoal or any other of the traditional high energy fuel that was heretofore used in commercial processes to produce the required high temperatures and reducing gases necessary for smelting iron. Further features of the invention will be described in more detail in connection with the accompanying figures and following specification describing the invention by way of example.

DETAILED DESCRIPTION OF THE PREFERRED EMBODIMENTS

Figure 1:
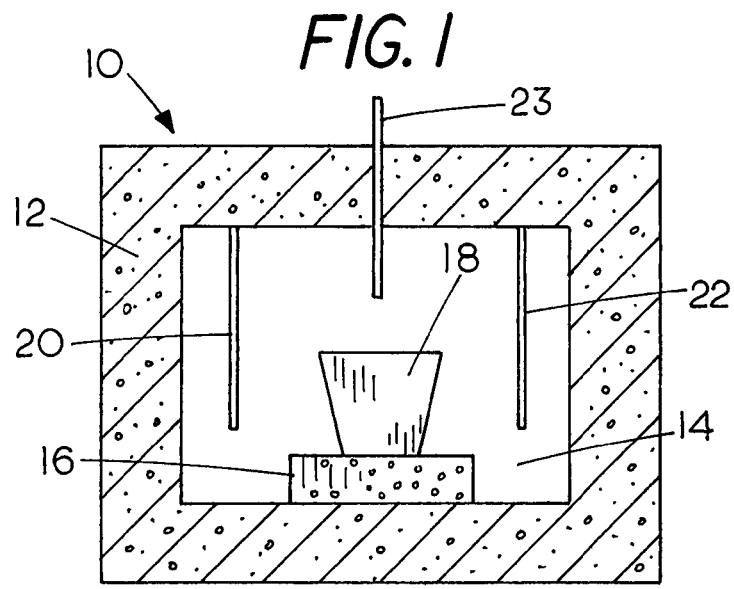
FIG. 1 is a diagrammatic vertical sectional view taken through a furnace showing the reduction of iron ore in accordance with the present invention.

The iron oxide ore used as a starting material, typically taconite, hematite or limonite can be used in any suitable commercially available particulate form, preferably in the form of fine particles. While particles as large as 0.25 inch in diameter or larger could be used, processing times would be unnecessarily long and particles would not lend themselves to being formed into a coherent mass. Consequently, it is preferred that small particles be used, the most preferred being particles that are finely ground. By "finely ground" is meant particles 90% of which will at least pass a 75 micrometer screen and most preferably a 90% passing a 50 micrometer screen. Very good results have been achieved by using ore particles in which 90% pass a 25-micrometer screen. Other particulate iron oxide ores can be used in the particle sizes that are commercially available. By using finely ground particles, it has been found that yields and processing times can be optimized and the ore is well adapted to be formed into a coherent mass such as a pellet, briquette or lump as will be described hereinbelow. Taconite ore for example is available commercially from ore concentrators which reduce the ore to particles, 90% passing 25 micrometers and consisting of 95% $Fe_3O_4$ and 5% silica. Generally speaking the finer the particles, the more readily they can be formed into a coherent mass and the faster the process time. The use of a binder is not utterly essential to the successful operation of the invention since any way of compacting the particles into a compact mass can be used.

To begin the process according to the present invention, the iron oxide particles are mixed with a reductant that is substantially devoid of free carbon. A suitable reductant can either be a biomass material or a plastic resinous material such as a synthetic resin especially a recycled or recyclable plastic resinous material in particulate form or mixture thereof in any proportion. The term "biomass" has been defined in the *McGraw Hill Chemical Encyclopedia of Science and Technology* 2005 as: "Organic matter produced by plants such as leaves, roots, seeds and stalks. In some cases, microbial and animal metabolic wastes are also considered biomass. The term biomass is intended to refer to materials that do not go directly into foods or commercial products but may have alternative industrial uses. Common sources of biomass are: 1.) agricultural wastes such as corn stalks, straw and hulls or manure, etc., 2.) woody materials, wood or bark, sawdust and mill scraps, 3.) municipal waste such as waste paper, grass, leaves and yard clippings, 4.) energy crops, such as poplars, willows, switchgrass, alfalfa, prairie bluestem, corn starch and soybean oil."

The term "biomass" used herein is however intended to be broader in scope than the foregoing definition and means any organic matter especially plant or animal matter containing organic polymeric material that is devoid or substantially devoid of free carbon. In addition to biomass materials, the invention can employ as a reductant a synthetic polymeric material that is devoid or substantially devoid of free carbon such as recycled or recyclable plastic that was formerly deposited in landfills. Biomass materials are distinctly different from the coal, charcoal or coke previously used in traditional smelting processes and in direct iron processing as noted above, since the latter comprise high energy fuels that are in large part or almost entirely free carbon. Biomass materials by contrast, as defined herein have very little if any free carbon. The carbon present is in organic polymeric molecules such as polysaccharides, cellulose, starch and lignin in the case of wood. Wood consists of 70%-80% cellulose, an organic polysaccharide polymer and 20%-30% lignin, a non-polysaccharide organic polymeric substance. Besides wood chips or wood pulp, sawdust, etc., of the invention can employ a wide variety of non-woody biomass material such as grass, grains, stalks and the like which consists largely of cellulose and other saccharide polymers.

As noted briefly above, coal, coke or charcoal were formerly relied upon to produce the reducing gases required. There was also heretofore, a general belief that only a fuel with a high heating value was effective. Wood, for example, has a heating value of only about half that of coal and less than half that of coke. Wood was therefore converted to charcoal in a separate process prior to smelting. Accordingly, well established commercial practice leads one away from the use of biomass materials as a reductant for smelting iron oxides. The biomass materials useful herein include carbohydrates and other organic polymeric compounds and hydrocarbons other than coal, coke or charcoal. Examples include paper, paper pulp, cellulositic paper mill waste sludge, ground wood, wheat flour, corn meal, dried sugar beet waste pulp, grass clippings, leaves and stems, chopped straw, corn stalks, sawmill waste, dried post-consumer organic wastes, dried sewage sludge, peat, starch, gluten, lignin, dried distillers grain and other solid residues from alcohol production, molasses, switchgrass and other biomass crops. Recycled or recyclable plastic resins can also be used, the most preferred being non-chlorinated plastic resin.

After the ore particles and the reductant are mixed together, the material is formed into a coherent mass. The mass can comprise pieces or lumps of any size desired the most useful being pellets, briquettes or other agglomerates in which the particles are bonded together by a binder that may comprise the reductant itself or a binder that has been added to the mass. While binding or coherency can be accomplished in many different ways that will be apparent to those skilled in the art, it is conveniently accomplished by adding water to the iron oxide and reductant mixture to form a dough especially when the organic material is derived from a biomass or by melting the organic resinous plastic material if it is thermoplastic into the iron oxide particulate material. If the reductant initially has adhesive qualities, the addition of water is not needed. The biomass itself normally provides the adhesion by acting as a binding agent to hold the mixture of iron ore and biomass material in a coherent mass i.e., in agglomerated form for enabling the material to be further processed. Biomass that is rich in starch such as flour works well as a binder. If the primary biomass being used has relatively little binding capacity such as ground wood, the addition of a small quantity of flour made from grain can be used as a binder and has been found to perform very well. It was found that the addition of grain flour in the amount of approximately 1%-2% by weight of the iron ore to which moisture has been added provides outstanding results as a binder. Lignin, gluten and other organic materials with adhesive qualities are also suitable for use as reductants with natural adhesive qualities allowing them to serve as a binder.

While the mass of ore and reductant material can be of any suitable size, it is preferred to provide pieces of pellets or briquettes which are small enough so that the heat quickly reaches the interior of each piece, the most useful being less than 4-8 cm. in diameter and preferably in the range of about 0.25 cm in diameter to about 4 cm in diameter, the most preferred being in the range of about ½ cm to 2.5 cm in diameter. It is convenient to form the coherent mass into generally round pellets which can be done in any known manner, for example, by using an ore pelletizer with a rotating surface supporting the mixture onto which water is sprayed as a fine mist or using any other suitable pellitizer known to those skilled in the art. If the formed pieces or pellets contain moisture, they are preferably dried at least until the pellets are self-supporting but most preferably until the pellets develop substantial firmness that enables them to be placed in a bed about 6 inches deep without falling apart.

After the ore and reductant have been weighed, they are thoroughly mixed in a mixer of any suitable commercially available type such as a kneader-mixer. Mixing is continued while the mass is moistened slightly until the mixture begins to agglomerate. In one preferred method the agglomerates are rolled, pressed or otherwise formed into balls or pellets containing, for example, 25 grams of iron ore concentrate each and 7.5 grams of the reductant. They are then dried in either a batch or continuous dryer, for example, at about 105° C. The formed coherent masses of material are now firm and have sufficient hardness to be self-supporting and to be placed in a bed of the pellets or lumps, briquettes typically about 6-8 inches deep in an industrial furnace. However, the depth of the bed is not critical. Small batch quantities for test purposes can comprise one or any number of pellets or pieces.

The furnace can be heated in any well known manner independently of the charge of material placed in the furnace, for example by the burning of solid or liquid fuel such as natural gas, propane, fuel oil or can be heated electrically with electric resistance heaters. One suitable furnace for experimental test runs is a Thermolyne Model F46128CM high temperature electrically heated furnace. Any of a variety of industrial scale furnaces can be used. Refer now to the figures which illustrate the invention further by way of example. A vertical sectional view of an electrically heated furnace used for experimental purposes is shown in FIG. 1. The furnace 10 comprised of a refractory enclosure 12 with a furnace chamber 14, a hearth plate 16 formed from a refractory and a crucible 18. Heat is supplied by two sets of electric heating elements shown at 20 and 22. A thermocouple is shown at 23. The crucible 18 which is formed from clay and graphite contains a refractory supporting bed 24 that does not enter into the chemical reaction or smelting process but serves to hold the ore pellet 26 in place in the oven and to receive the metallic iron that is produced. By the term "refractory" herein is meant a material adapted to retain its physical shape and chemical identity when subjected to smelting furnace temperatures and which does not enter chemically into the reduction of the ore. During the firing process which may be accomplished in as little as 20 minutes, the organic material making up the reductant contained in the pellet 26 decomposes and it is the decomposition products of the organic material that reduce the iron oxide to metallic iron. The metallic iron melts while impurities are expelled from the melt as a slag product leaving one or more droplets 28 and 30 that upon cooling solidify as pieces of metallic iron suitable for use in steel making. During the smelting process, the metallic iron absorbs excess carbon from the organic material which becomes incorporated into the iron allowing it to melt at a lower temperature (about 1200° C.) than is possible with pure iron which melts at about 1539° C.

Other materials such as calcium oxide or calcium carbonate can be added as fluxes to improve the melting and slag separation from the metallic iron. The finished agglomerates or other coherent masses of material are further processed in a separator of any well known commercially available kind to separate and collect the metallic iron.

It can be seen from the above description that the invention has the advantage of allowing renewable and recyclable organics to be used as reducing agents without having to first process the organics to produce charcoal or otherwise prepare them for the smelting process. Accordingly, they can be used in a raw form and since many of them are surplus or considered to be waste products the smelting process can often be carried out at a low cost. Moreover, the production of iron from renewable organics is critical in making iron production an environmentally sustainable industry. Another advantage of the invention results from the fact that the biomass material or other organic acts as a binder for the pellets holding them together until the reactions are completed. This makes it unnecessary to use additional binders such as bentonite clay. The elimination of separate binders results in less contamination of the product, smaller quantities of slag and simplifies the control of slag properties.

Figure 3:
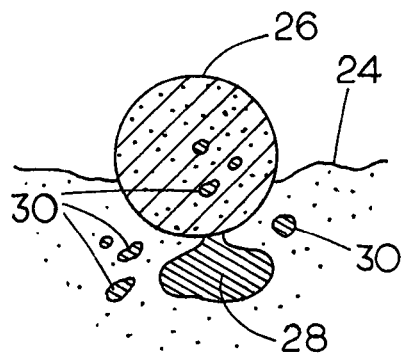
FIG. 3 shows the appearance of a typical pellet after smelting to illustrate metallic iron bodies separate from the slag and FIG. 4 is a diagrammatic longitudinal sectional representation of one example to illustrate the use of the invention on an industrial scale.

The size of the iron nuggets 28 and 30 produced is controlled by supporting the pellets on a refractory bed preferably composed of particles that will not be wetted by the molten metal so that the droplets are distinct from the refractory supporting medium and can be separated from it. FIG. 3 shows the iron nuggets after smelting. It was found that the size of the iron pieces that are produced is controlled by supporting the coherent mass of ore and reductant 26 on a bed of refractory particles 24 especially fine particles that will not be wetted by the molten metal 28 and 30. As the pellets 26 or other bodies are converted to metallic iron nuggets 28 and 30, the liquid iron melts and flows to collect in pockets in the refractory bed under the pellets. Some of these drops of liquid iron merge, but for the most part, they remain as separate drops 28 and 30 that form individual metal bodies or nuggets upon cooling. Various refractory materials can be used. Examples of suitable refractories include alumina ($Al_2O_3$) mixed with boron nitride or mullite (Sillimanite) ($2SiO_2$: $3Al_2O_3$) mixed with zirconia ($ZrO_2$). Another suitable refractory that can be used is powered graphite or carbon particles such as petroleum coke. In producing sample quantities of metallic iron as in the figures, a refractory comprising bed of ground petroleum coke which largely fills the crucible can be used. The refractory material is not consumed but only serves to support the agglomerates as they melt to form free metallic iron while the pellets 26 or other agglomerates of ore and biomass material rest on the loose bed of refractory material 24.

Figure 4:
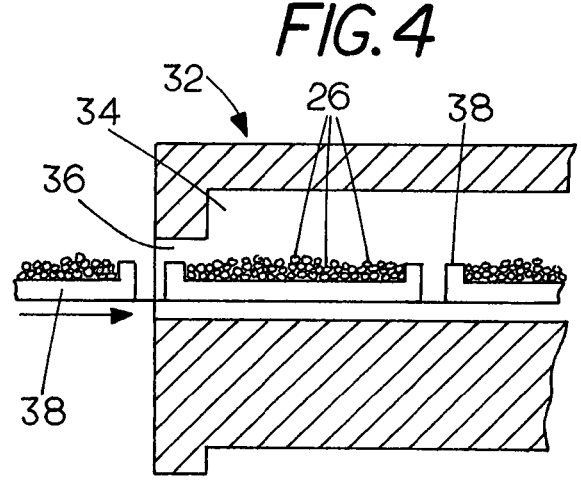

Refer now to FIG. 4 which illustrates diagrammatically a smelting operation in accordance with the invention in an industrial smelting furnace that is used on a commercial scale for smelting iron. In this case a conveyorized furnace is shown by way of example. The invention can however be applied in a variety of furnaces including rotary hearth furnaces, shaft furnaces or bath smelting furnaces among others. The furnace indicated generally by the numeral 32 is formed largely from a refractory material and includes a furnace chamber 34 having an inlet 36 and a conveyorized transporter only a part of which is shown including ore carriers 38 that pass into the furnace 32 during operation through the inlet 36 into the heated furnace interior 34. The carriers 38 are filled as they enter the furnace with a layer of the preformed bodies 26 containing the ore and reductant as described above which can be piled up to any desired depth or placed in a single layer equal to the height of only one of the bodies 26 so that each one of the agglomerates 26 is supported on the upwardly facing refractory surface of the carrier 38 which may be either a solid refractory or comprise loose particles of any suitable commercially available refractory in powered form. After the smelting operation is completed in the furnace 32, the carriers 38 are unloaded and the metallic iron is separated from the remaining slag. The resulting iron pieces or nuggets are conveniently shipped, are stable against corrosion and can be used as a replacement for scrap iron in basic oxygen furnaces or for remelting in electric furnaces used in steel making.

It has been found that smelting can be carried out at relatively low temperatures using the invention. Iron nuggets have been produced using biomass reductant at temperatures of 1350° C.-1450° C. with processing times of from about 20 to about 40 minutes. The highest furnace temperature that can be used is limited only by the capability of the furnace. It is possible that metallic iron could be made using the invention at a temperature somewhat lower than 1350° C. e.g., 1300° C. by allowing additional time for the carbon contained in the biomass material or synthetic resin to diffuse into the metal and reduce its melting point. In an industrial implementation, any heat source capable of reaching the desired temperature will be suitable as previously noted including electric heating, natural gas, coal combustion or the combustion of any other economical high temperature fuel. The invention is capable of producing outstanding yields. Yields as high as 84.5% have already been achieved which compares very favorably with that of a conventional blast furnace which may yield only 1,000 tons of pig iron for each 2,000 tons of hematite ($Fe_2O_3$) for a yield of 71.4%.

After smelting when the agglomerate has cooled it was found that the porous, low-density slag contained most of the impurities and that it easily broke free from the metallic iron bodies that were produced. While the metallic iron can be produced with only the theoretical stoichiometric amount needed to reduce the iron, for practical purposes and to assure sufficient reductant, in practice a quantity of organic material is used that is in excess of the amount that is theoretically needed to reduce the iron. The iron ore preferably comprises between about 60%-90% by weight of the mass and most preferably from about 65% to about 85% of the mass. Iron nuggets can be successfully produced using the invention with essentially complete reduction of the iron oxides to iron using biomass additions material in the range of about 20%-30% of the oxide by weight of the pellet or other agglomerated mass. Both magnetite ($Fe_3O_4$,) and hematite ($Fe_2O_3$) have been successfully reduced through the use of the invention to produce metallic iron. The carbon content of the resulting metallic iron was in the range of about 2% to about 4%; a pig iron product which may have an iron content up to about 4% by weight. Pig iron produced by traditional processes averages about 92%-94% iron with the balance made up of carbon and other impurities. The pig iron produced by the present invention is stable against corrosion, can conveniently be shipped and is outstanding feed stock for steel making either by remelting in electric furnaces or by replacement of scrap iron in basic oxygen furnaces.

On an industrial scale, the present invention makes it possible to produce pig iron nuggets using any of several types of furnaces including rotary hearth furnaces, shaft furnaces or bath smelting furnaces. In addition to electric resistor furnaces, other types of furnaces can be used such as induction heating furnaces in which an alternating magnetic flux is used to produce heating in an electrically conductive substance or by other means such as arc furnaces, among others. As already noted, the heat for carrying out the smelting operation is supplied separately from the material used as a reductant in the conversion process while the reducing power for converting the oxide to free metal is provided by the hydrocarbon or carbohydrate polymer that is part of the coherent mass that makes up the pellet, briquette or other agglomerated body.

The iron making industry has, prior to the present invention been unable to take advantage of the large quantities of biomass and recycled organics such as recycled synthetic plastic resins in smelting iron ore which the present invention now makes use of.

The invention has a number of advantages and benefits. Since the reductant is derived from renewable sources, the process results in no net increase in atmospheric carbon dioxide over the long term. The reductant can also be produced locally, close to the iron processing facility rather than being shipped a considerable distance. Moreover, the hydrogen content of the reductant assists in the reduction of the metal oxides. The hydrogen that is not consumed by reacting with ambient oxygen is available for reducing the metal oxides. In the present invention, the reductant is not the primary source of heat. External heat is provided as described above in any convenient way. This makes it possible to select reductants entirely based on their performance as reducing agents without regard to their value as a fuel. The heat source can be optimized separately with the sources of heat selected based only on their heating efficiency but without regard to whether they have any ability to reduce iron oxide to the metallic iron. This allows the present process to be more efficient than prior processes using coal, coke, charcoal as a reductant and heating fuel.

Another benefit results from the adhesive qualities that are present in many biomass materials which act as binders to hold the iron ore reductant bodies together as a cohesive mass while they are processed. There is therefore no need to use inorganic binders such as bentonite clay which would contaminate the ore and result in increased slag volumes. Moreover, most biomass materials have a low content of inorganic compounds and therefore produce lower slag volumes than reductants such as coal or charcoal which have a much higher content of inorganic matter.

All references cited herein are incorporated by reference to the same extent they would be if reproduced in full within the text of the present application.

The invention will be better understood by reference to the following examples:

EXAMPLE 1

Figure 2:
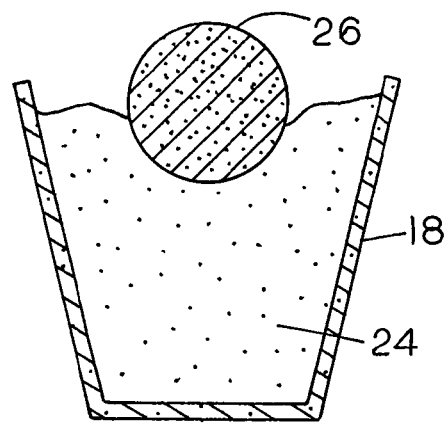
FIG. 2 is a vertical sectional view taken through the crucible shown in FIG. 1 on a larger scale with an iron ore mass as it appears before smelting in the furnace.

An iron ore concentrate comprising magnetite ($Fe_3O_4$) from the Empire mine, Ishpeming MI, consisting of particles 90% passing 25-micrometer screen and containing 5% silica was mixed with ground wood comprising Carbondry® wood chips averaging about 1 inch in length and ⅛ inches in thickness provided by Carbontec, Energy Corporation of Bismarck N.D. containing about 5% moisture. The chips were dry ground in a rod mill to pass through a 4.75 mm sieve. A small quantity of wheat flour was also added to act as a binder since the ground wood did not have enough cohesion to be formed into a cohesive mass. The magnetite and ground wood and flour were weighed, mixed together in a kneader-mixer with moisture added to produce slight moistening until the mixture began to agglomerate. The mixture was then formed into balls containing about 25 grams of iron ore concentrate and about 7.5 grams of ground wood chips and wheat flour, resulting in a reductant weight that was 30% of the weight of the magnetite. The agglomerated pellets which averaged about 2 cm in diameter were then dried at 105° C. and placed in a clay graphite crucible as shown in FIGS. 1 and 2 containing a refractory supporting base consisting of petroleum coke which held the pellets but was not consumed and did not enter into the reaction. The agglomerated pellets were fired at a temperature of about 1475° C. for about 25 minutes. After cooling, the metallic iron that was produced was separated easily from the adhering slag.

EXAMPLE 2

Metallic iron was produced from magnetite in four experiments as in Example 1 except that the firing temperature was reduced to 1425° C. and 1400° C. The feed mixture consisted approximately of magnetite 100 grams, ground wood 30 grams and wheat flour 2 grams. The combined mixture was divided into four portions to form agglomerates containing approximately 25 grams of magnetite, 7.5 grams of ground wood, and 0.5 grams of wheat flour each. A good metallic iron product was produced when the firing time was at least 20 minutes.

EXAMPLE 3

In a third run, the feed mixture consisted of magnetite 100 grams, ground wood 20 grams and wheat flour 2 grams. The combined mixture was divided into four portions to form agglomerates containing approximately 25 grams of magnetite, 5 grams of ground wood, and 0.5 grams of wheat flour each. The individual pellets were then fired at temperatures ranging from 1375° C. to 1425° C. After firing in the furnace, a good metallic iron nugget product was produced.

The results obtained from Examples 2 and 3 are shown in Table 1 below:

TABLE 1

| Example | Sample Number | Mixture Ratio Magnetite; Wood; Flour | Furnace Temp., ° C. | Heating Time, Minutes | Initial Pellet Wt., Grams | Finished Nugget Wt., Grams | Estimated % iron recovery |
|---|---|---|---|---|---|---|---|
| 2 | 1 | 100:30:2 | 1425 | 15 | 31.4 | (no slag separation) | |
|   | 2 | 100:30:2 | 1425 | 20 | 32.13 | 13.78 | 82.29 |
|   | 3 | 100:30:2 | 1425 | 25 | 31.54 | 13.82 | 84.07 |
|   | 4 | 100:30:2 | 1400 | 30 | 31.94 | 14.07 | 84.52 |
| 3 | 5 | 100:20:2 | 1425 | 25 | 30.27 | 13.87 | 81.26 |
|   | 6 | 100:20:2 | 1425 | 20 | 29.65 | 11.56 | 69.14 |
|   | 7 | 100:20:2 | 1400 | 30 | 29.95 | 13.14 | 77.81 |
|   | 8 | 100:20:2 | 1375 | 30 | 29.63 | 13.08 | 78.28 |

The column marked "Initial Pellet Weight" is the total weight of the individual pellet including magnetite reductant and binder. The estimated percentage of iron recovery is based only on the weight of the primary metallic iron piece produced and does not include the weight of the small beads of metal which were included in the slag. It was concluded that under the conditions existing in the furnace that was used, a minimum of 20 minutes was needed to carry the reduction process to completion and for the metal and slag to separate successfully.

The nuggets made with a lower content of ground wood had a slightly reduced iron recovery compared to pellets made with a higher wood content indicating that a 20% level is not sufficient to completely reduce all of the iron oxide to metal in the furnace that was used. It was found that metallic iron could be successfully made at a furnace temperature as low as 1375° C. The nuggets produced had a mean apparent density of 7.3 g/cm$^3$ which is denser than a directly reduced iron that is currently being produced using mixtures of powdered coal and iron particles and is comparable to pig iron produced by a blast furnace. The carbon content is about 4%.

EXAMPLE 4

In another run, agglomerates comprising pellets were made using the following compositions: 50 grams magnetite and 20 grams of polypropylene plastic resin. After mixing, the mixture was heated in a microwave oven to melt the polypropylene which was then mixed thoroughly, divided in half, and pressed into two compact coherent masses about 2 cm in diameter each and allowed to cool and harden. In a second sample run, the polypropylene was replaced with 20 grams of wheat flour and a small quantity of water to make a stiff dough. This mixture was kneaded and formed into two balls approximately 2 cm in diameter then heated to 100° C. until dried.

In both compositions, the agglomerated pellets were processed as follows. A clay-graphite crucible was filled with a refractory supporting base consisting of granular coke (carbon) to hold the agglomerates in place as shown in FIG. 2. The crucible was placed in the electrically heated box furnace (FIG. 1) that had already been heated to 1475° C. The crucible containing the agglomerated pellets remained in the furnace for 20 minutes and was removed and allowed to cool naturally to room temperature. The metallic iron product produced was a high-density metallic iron body 28 that contained the majority of the iron originally present in the iron oxide organic agglomerate together with a porous, low-density slag that contained most of the impurities and was easily broken free from the surface of the metallic iron body produced.

EXAMPLE 5

Iron ore reduction is carried out as in Example 2 except that in place of ground wood, the following reductants are used in separate product runs: paper particles, paper pulp, cellulositic paper mill waste sludge, ground wood, dried sugar beet waste pulp, grass clippings, recycled and recyclable plastic resinous material, wheat flour, corn meal, chopped straw, corn stalks, sawmill waste, dried post-consumer organic wastes, dried sewage sludge, peat, starch, gluten, lignin, dried distillers grain, solid residue from alcohol production, molasses and switchgrass.

All quantities presented herein are given in parts or percentages by weight.

Many variations of the invention within the scope of the following claims will be apparent to those skilled in the art once the principles described above are understood.

What is claimed is:

1. A method for the direct production of a metallic iron product from iron in an oxidized state utilizing a single heat treatment step comprising,
    providing a source of iron particles in an oxidized state
    providing a reductant including at least one material selected from the group consisting of particles of biomass material, a plastic resinous material and mixtures thereof, said material being substantially devoid of free carbon,
    mixing the reductant together with iron in said oxidized state to form a combined mass thereof,
    placing the combined mass in a furnace for reducing the mass while the biomass or resin remains in an uncarburized state,
    heating the combined mass in said reducing furnace sufficiently to enable the reductant material to reduce oxidized iron by direct action of constituents released from the heated reductant material,
    whereby metallic iron product is produced within the furnace.

2. A method as in claim 1 including the step of providing at least part of said iron in an oxidized state, as at least one iron compound selected from the group consisting of magnetite, hematite or limonite.

3. A method as in claim 1 wherein the biomass material and the resinous material are placed in the furnace substantially devoid of free carbon and the combined mass is heated in said furnace sufficiently to reduce oxidized iron by a direct action of the reductant through the libration of hydrogen and free carbon from the biomass or resinous material within the furnace.

4. A method as in claim 1 wherein the combined mass is formed into separate bodies selected from the group consisting of pellets, briquettes, pieces and lumps prior to being placed in said reducing furnace.

5. A method as in claim 1 including mixing a binder with the combined mass for binding the particles to each other before heating the combined mass.

6. A method as in claim 1 wherein the plastic resinous material is provided as a substantially chlorine-free plastic resin.

7. A method as in claim 1 wherein the combined mass comprises separate bodies that are heated sufficiently in the furnace to form bodies of metallic iron and slag and including separating the slag from the bodies of metallic iron.

8. The method of claim 1 wherein the combined mass comprises pieces or bodies and the pieces or bodies are supported in the furnace on a bed comprising at least one member selected from a non-carbonaceous refractory material and a carbonaceous refractory material comprising graphite or carbon particles.

9. The method of claim 1 including
    forming the combined mass into separate bodies selected from the group of pellets, briquettes, pieces or lumps or combinations thereof,
    providing as said iron in an oxidized state, particles of iron ore,
    the combined mass comprising bodies of iron ore and one or more compounds reductant are fired in the furnace to thereby produce bodies of a pig iron product, and
    removing the pig iron product bodies from furnace and separating slag therefrom.

10. The method of claim 1 wherein,
    the iron in an oxidized state comprises iron ore in particulate form, the combined mass is placed into at least one body of a selected form, the at least one body is supported within the furnace on a bed of material comprising a refractory substance, and the at least one body is fired in the furnace at a temperature of at least about 1300° C. to thereby directly form bodies of a metallic iron product in said furnace in the absence of further heat treatment following removal thereof from the furnace.

11. The method of claim 1 wherein the biomass is selected to have an adhesive quality to thereby act as a binder for causing the combined mass to adhere in the formation of separate bodies thereof.

12. The method of claim 1 wherein the combined mass includes a smelting flux for improving slag and melting properties of the metal.

13. A method as in claim 1 wherein said iron product includes pig iron.

14. A method as in claim 1 wherein said reducing furnace is heated to temperatures of at least about 1300° C.

15. The method of claim 1 wherein the combined mass includes a smelting flux for improving slag and melting properties of the metal and the combined mass comprises separate bodies that are heated sufficiently in the furnace to form bodies of metallic iron and slag and including separating the slag from the bodies of metallic iron.

* * * * *